United States Patent
Almaraz

(10) Patent No.: US 12,221,219 B2
(45) Date of Patent: Feb. 11, 2025

(54) PRESSURE RELIEF DOOR ASSEMBLY WITH TEMPERATURE-ACTUATED LOCK

(71) Applicant: ROHR, INC., Chula Vista, CA (US)

(72) Inventor: Hugo Almaraz, San Juan Capistrano, CA (US)

(73) Assignee: ROHR, INC., Chula Vista, CA (US)

( * ) Notice: Subject to any disclaimer, the term of this patent is extended or adjusted under 35 U.S.C. 154(b) by 533 days.

(21) Appl. No.: 17/559,972

(22) Filed: Dec. 22, 2021

(65) Prior Publication Data
US 2023/0192307 A1   Jun. 22, 2023

(51) Int. Cl.
*E05B 51/00* (2006.01)
*B64D 29/06* (2006.01)
*B64D 29/08* (2006.01)
*B64C 1/00* (2006.01)

(52) U.S. Cl.
CPC ............. *B64D 29/06* (2013.01); *B64D 29/08* (2013.01); *E05B 51/005* (2013.01); *B64C 2001/009* (2013.01)

(58) Field of Classification Search
CPC ...... E05B 51/00; E05B 51/005; E05B 51/023; E05B 65/0082; E05B 65/104; E05B 47/0009; E05B 2063/0091; B64D 29/06; B64D 29/08
See application file for complete search history.

(56) References Cited

U.S. PATENT DOCUMENTS

| | | | |
|---|---|---|---|
| 5,771,742 A | 6/1998 | Bokaie et al. | |
| 2016/0053719 A1* | 2/2016 | Pretty | B64D 29/06 239/265.19 |
| 2017/0122015 A1* | 5/2017 | Do | E05B 51/023 |
| 2020/0095806 A1* | 3/2020 | Diaz | E05B 51/023 |

FOREIGN PATENT DOCUMENTS

| | | | | |
|---|---|---|---|---|
| EP | 2907946 A1 * | 8/2015 | | B64D 29/06 |
| WO | WO-2011069103 A1 * | 6/2011 | | E05B 5/00 |

OTHER PUBLICATIONS

European Patent Office, European Search Report dated May 3, 2023 in Application No. 22210018.2.

* cited by examiner

*Primary Examiner* — Christine M Mills
*Assistant Examiner* — Christopher F Callahan
(74) *Attorney, Agent, or Firm* — SNELL & WILMER L.L.P.

(57) ABSTRACT

A pressure relief door assembly includes a pressure relief door, a pressure-actuated latch, and a temperature-actuated lock. The latch is disposable in each of a latched configuration (to retain the pressure relief door in a closed position) and an unlatched configuration (to allow the pressure relief door to move into an open position). The lock is disposable in each of an unlocked configuration (to allow the pressure relief door to move into the open position when the latch is in its unlatched configuration) and a locked configuration (e.g., to lock the latch in its latched configuration, to lock the pressure relief door in its closed position, or both). The lock may include a bimetallic coil, that when exposed to a temperature that satisfies a temperature threshold, expands a sufficient amount to engage a locking pin with a corresponding portion of the latch to retain the latch in its latched configuration.

18 Claims, 11 Drawing Sheets

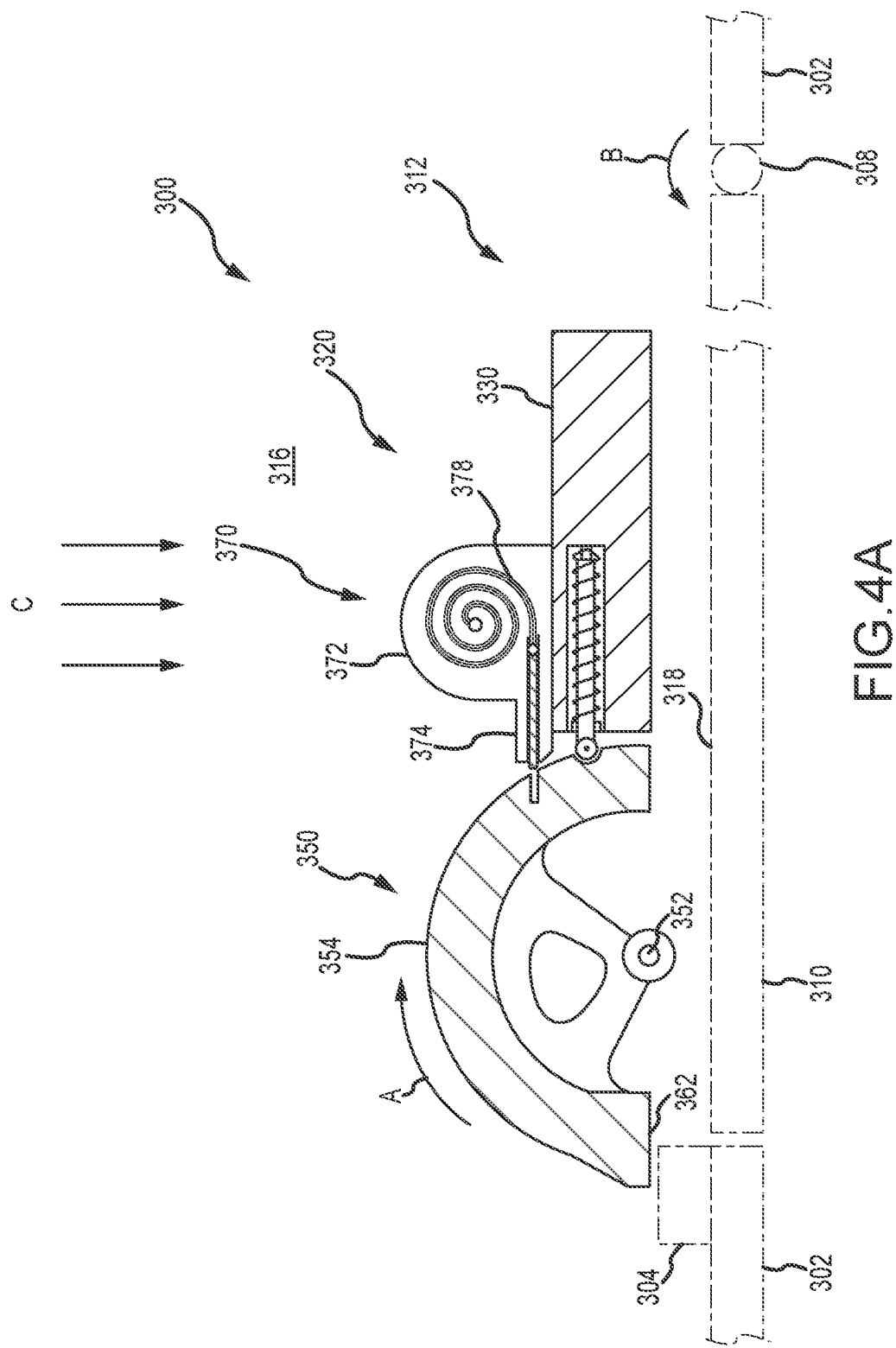

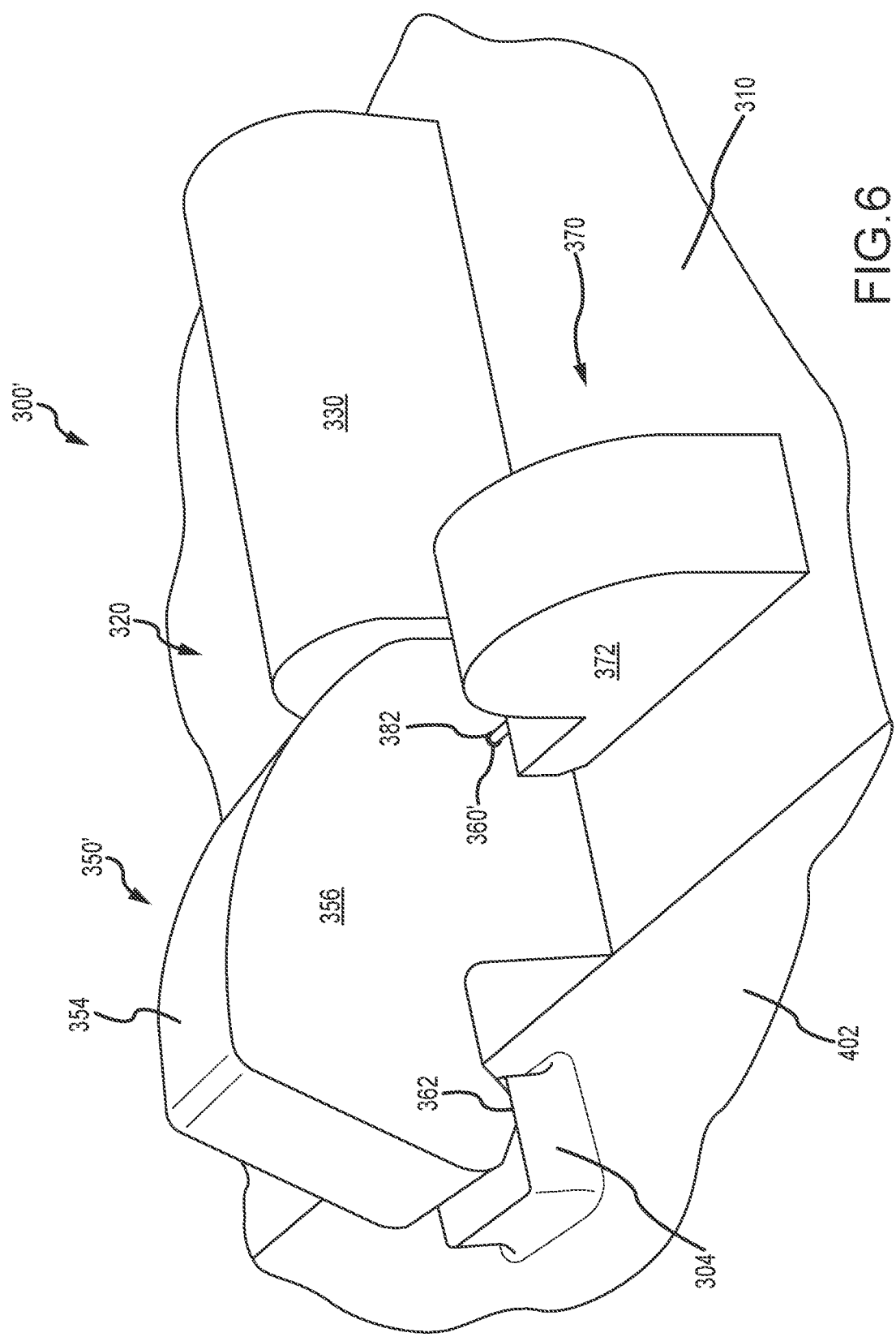

PRESSURE RELIEF DOOR ASSEMBLY WITH TEMPERATURE-ACTUATED LOCK

FIELD

The present disclosure generally relates to the field of pressure relief doors and, more particularly, to latches for such pressure relief doors.

BACKGROUND

A nacelle for an aircraft propulsion system typically includes an inlet, a fan cowl, a thrust reverser, and an exhaust section. The nacelle is typically mounted to a wing or a fuselage of an aircraft via a pylon. The nacelle may provide smooth, aerodynamic surfaces for airflow around and into a gas turbine engine located within the nacelle.

Access doors may be incorporated at different locations on a nacelle to allow for easy and/or quick maintenance access. Pressure relief doors may also be incorporated by the nacelle to help reduce the internal pressures in the event of a failed pressurized ducting, which may be located throughout the interior of the nacelle. Some doors may serve as both an access door and a pressure relief door (i.e., a dual purpose door).

One or more pressure relief latches are typically used to control movement of a pressure relief door from a closed position to an open position. A pressure relief door may be disposed in its open position to reduce an increased pressure within the nacelle, for instance due to a burst event, failure of pressurized ducting, or the like. A pressure relief latch is disposable in each of a latched configuration (e.g., to retain the corresponding pressure relief door in its closed position) and an unlatched configuration (e.g., to allow the corresponding pressure relief door to move to its open position). Pressure relief latches are susceptible to failure in the case of at least a certain temperature increases within the nacelle, for instance due to a fire, engine failure, or the like. If a pressure relief latch fails and allows the corresponding pressure relief door to open during an elevated temperature event within the nacelle, additional air may be directed into the interior of the nacelle to support combustion. One option for addressing this elevated temperature issue is the use of thermal blanket installations. Thermal blanket installations have been utilized to reduce the potential of pressure relief latches being heated by an engine fire or the like to the point where the latch changes to its corresponding unlatched configuration to allow the corresponding pressure relief door to move to its open position.

SUMMARY

A pressure relief door assembly is presented herein. Both the configuration of such a pressure relief door assembly (including at least certain individual components/subassemblies thereof) and the operation/assembly/manufacture of such a pressure relief door assembly are within the scope of this Summary.

One aspect is directed to a pressure relief door assembly that includes a pressure relief door, a latch, a lock. The pressure relief door is movable (e.g., via a pivoting or pivotal-like action) between a closed position and an open position. The latch is disposable in each of a latched configuration and an unlatched configuration relative to the pressure relief door. The lock is disposable in each of a locked configuration and unlocked configuration relative to at least one of the latch and the pressure relief door. The lock may change from its unlocked configuration to its locked configuration when a temperature threshold is satisfied. Disposing the lock in its locked configuration may retain the latch in its latched configuration, may retain the pressure relief door in its closed position, or both.

Operation of the latch may be characterized as being pressure-dependent. The latch may change from its latched configuration to its unlatched configuration upon satisfaction of two condition precedents—one being the lock is in its unlocked configuration and the other being that a pressure threshold has been satisfied (e.g., when a pressure exerted on the pressure relief door at least one of reaches or exceeds a predetermined pressure, when at least a certain pressure differential exists across the pressure relief door, or both).

Operation of the lock may be characterized as being temperature-dependent, and the may change from its unlocked configuration to its locked configuration when a temperature threshold is satisfied. The lock may be disposed in its locked configuration when the pressure relief door assembly is exposed to a temperature that at least one of reaches or exceeds a predetermined temperature.

Another aspect is directed to a pressure relief door assembly that includes a latch body, a detent, a lock, and a latch bolt. The detent may be movably interconnected with the latch body (e.g., to allow the detent to move axially relative to the latch body). The lock may include a bimetallic coil and a locking member. The latch bolt is movable relative to the latch body, includes a detent recess that is alignable with the detent for the latch body, and a locking recess that is alignable with the locking member of the lock. The latch may be disposed in its latched configuration when the detent for the latch body is disposed in the detent recess of the latch bolt. The lock may be disposed in a locked configuration when the locking member is disposed in the locking recess of the latch bolt.

Another aspect is directed to a pressure relief door assembly that includes a housing, a bimetallic coil, and a locking member. The bimetallic coil is disposed within the housing. A locking member extends from the bimetallic coil, is movable relative to the housing, and may be at least partially disposed within the housing. The pressure relief door assembly includes an unlocked configuration (where the bimetallic coil is in a contracted state and with the locking member being in a first position relative to the housing) and a locked configuration (where the bimetallic coil is in an expanded state and with the locking member being in a second position relative to the housing where the locking member protrudes beyond the housing.

Yet another aspect is directed to operation of a pressure relief door assembly that includes a pressure relief door that is disposable in each of a closed position and an open position, a latch that is disposable in each of a latched configuration and an unlatched configuration relative to the pressure relief door, and a lock. The lock is changed from an unlocked configuration to a locked configuration in response to a temperature (e.g., an ambient temperature to which the pressure relief door assembly is exposed) satisfying a temperature threshold. The pressure relief door is retained in a closed position when the lock is in its locked configuration.

Satisfaction of the temperature threshold in relation to the lock may be when the pressure relief door assembly is exposed to a temperature that at least one of reaches or exceeds a predetermined temperature. Changing the lock to its locked configuration may further include or more of: 1) moving a locking member of the lock into engagement with the latch to retain the latch in its latched configuration relative to the pressure relief door (e.g., such that the lock indirectly retains the pressure relief door in its closed position); 2) expanding a bimetallic coil of the lock (e.g., to move a locking member of the lock into engagement with a corresponding portion of the latch); and/or 3) moving a locking member of the lock along an axial path.

A temperature to which the pressure relief door assembly is exposed may be increased while the latch is in its latched configuration, again where the latched configuration retains the pressure relief door in its closed position. The lock may be changed to its locked configuration in response to this increasing temperature before the latch is able to change from its latched configuration to its unlatched configuration (the pressure relief door again being movable to its open position with the latch being in its unlatched configuration).

Various aspects of the present disclosure are also addressed by the following examples and in the noted combinations:

1. A pressure relief door assembly, comprising:
   a pressure relief door movable between an open position and a closed position;
   a latch disposable in each of a latched configuration and an unlatched configuration relative to said pressure relief door; and
   a lock disposable in each of a locked configuration and an unlocked configuration relative to said latch, wherein said lock is configured to change from said unlocked configuration to said locked configuration in response to a temperature threshold being satisfied to retain said latch in said latched configuration to in turn retain said pressure relief door in said closed position.
2. The pressure relief door assembly of example 1, wherein satisfaction of said temperature threshold comprises said pressure relief door assembly being exposed to a temperature that at least one of reaches or exceeds a predetermined temperature.
3. The pressure relief door assembly of any of examples 1-2, wherein said lock comprises a movable locking member, and wherein said locking member is engaged with said latch when said lock is in said locked configuration.
4. The pressure relief door assembly of any of examples 1-2, wherein said lock comprises a movable locking member and a bimetallic coil.
5. The pressure relief door assembly of example 4, wherein said locking member is interconnected and movable with said bimetallic coil.
6. The pressure relief door assembly of any of examples 4-5, wherein said locking member is movable along an axial path.
7. The pressure relief door assembly of any of examples 4-6, wherein said locking member comprises a locking pin.
8. The pressure relief door assembly of any of examples 4-7, wherein said latch comprises a locking recess, wherein said locking member is disposed in said locking recess of said latch when said lock is in said locked configuration, and wherein said locking member is disposed out of said locking recess of said latch when said lock is in said unlocked configuration.
9. The pressure relief door assembly of any of examples 4-8, wherein said bimetallic coil is disposed in a contracted configuration when said lock is in said unlocked configuration and is disposed in an expanded configuration when said lock is in said locked configuration.
10. The pressure relief door assembly of any of examples 4-9, wherein said lock further comprises a housing, and wherein said bimetallic coil is disposed in said housing.
11. The pressure relief door assembly of example 10, wherein said locking member protrudes beyond said housing at least when said lock is in said locked configuration.
12. The pressure relief door assembly of any of examples 1-11, wherein operation of said latch is pressure dependent and operation of said lock is temperature dependent.
13. The pressure relief door assembly of any of examples 1-12, wherein said latch comprises a first latch component, a second latch component, and a detent, said first latch component is retained in a fixed position relative to said pressure relief door, said second latch component is movable relative to each of said first latch component and said pressure relief door, said detent is movably interconnected with said first latch component, and said detent extends beyond said first latch component and is engageable with said second latch component to dispose said latch in said latched configuration where said second latching member is retained in a fixed position relative to said first latching member.
14. The pressure relief door assembly of example 13, wherein said second latch component is rotatable relative to said first latch component.
15. The pressure relief door assembly of any of examples 13-14, further comprising a spring seated against said first latch component and engaged with said detent.
16. The pressure relief door assembly of example 15, wherein said spring biases said detent toward said second latch component.
17. The pressure relief door assembly of any of examples 13-16, wherein said detent is biased into engagement with said second latch component.
18. The pressure relief door assembly of any of examples 13-17, wherein said second latch component comprises a detent recess engageable by said detent.
19. The pressure relief door assembly of any of examples 13-18, wherein said latch changes from said latched configuration to said unlatched configuration when said lock in in said unlocked configuration and when a pressure threshold is satisfied, and wherein satisfaction of said pressure threshold comprises at least one of: a) a pressure exerted on said pressure relief door at least one of reaching or exceeding a predetermined pressure; and b) an existence of at least a certain pressure differential across said pressure relief door.
20. A nacelle comprising the pressure relief door assembly of any of examples 1-19.
21. An aircraft comprising the nacelle of example 20.
22. An aircraft comprising the pressure relief door assembly of any of examples 1-20.
23. A pressure relief door assembly, comprising:
   a latch body;
   a detent movably interconnected with said latch body;
   a lock comprising a bimetallic coil and a locking member interconnected and movable with said bimetallic coil; and
   a latch bolt movable relative to the latch body, wherein said latch bolt comprises a detent recess alignable with said detent and a locking recess alignable with said locking member of said lock, wherein a latch comprises said latch body and said latch bolt, wherein said latch is in a latched configuration when said detent is disposed in said detent recess of said latch bolt, and wherein said lock is disposed in a locked configuration when said locking member is disposed in said locking recess of said latch bolt.
24. The pressure relief door assembly of example 23, wherein said detent is movable along an axial path.

25. The pressure relief door assembly of any of examples 23-24, further comprising a spring seated against said latch body and engaged with said detent.

26. The pressure relief door assembly of example 25, wherein said spring biases said detent toward said latch bolt.

27. The pressure relief door assembly of any of examples 23-26, wherein said detent is biased into engagement with said latch bolt.

28. The pressure relief door assembly of any of examples 23-27, wherein said latch bolt is rotatable relative to said latch body.

29. The pressure relief door assembly of any of examples 23-28, wherein said detent is disposed within said detent recess of said latch bolt until a pressure threshold is satisfied.

30. The pressure relief door assembly of example 29, wherein satisfaction of said pressure threshold comprises at least one of: a) a pressure exerted on said pressure relief door at least one of reaching or exceeding a predetermined pressure; and b) an existence of at least a certain pressure differential across said pressure relief door.

31. The pressure relief door assembly of any of examples 23-30, wherein said locking member is disposed out of said locking recess of said latch bolt prior to a temperature threshold being satisfied.

32. The pressure relief door assembly of example 31, wherein said locking member is disposed within said locking recess of said latch bolt when said temperature threshold is satisfied.

33. The pressure relief door assembly of any of examples 23-30, wherein said locking member is disposed within said locking recess of said latch bolt when a temperature threshold is satisfied.

34. The pressure relief door assembly of any of examples 31-33, wherein satisfaction of said temperature threshold comprises said pressure relief door assembly being exposed to a temperature that at least one of reaches or exceeds a predetermined temperature.

35. The pressure relief door assembly of any of examples 23-34, further comprising:
    an unlocked configuration where said bimetallic coil is in a contracted state and with said locking member being disposed out of said locking recess of said latch bolt;
    wherein said locked configuration comprises said bimetallic coil being in an expanded state.

36. The pressure relief door assembly of any of examples 23-34, further comprising a pressure relief door.

37. The pressure relief door assembly of example 36, wherein said latch body is retained in a fixed position relative to said pressure relief door and said latch bolt is movable relative to each of said latch body and said pressure relief door.

38. The pressure relief door assembly of any of examples 36-37, wherein said pressure relief door is movable between open and closed positions, wherein said pressure relief door is retained in said closed position when at least one of said latch is in said latched configuration and said lock is in said locked configuration.

39. The pressure relief door assembly of example 38, wherein said pressure relief door is movable to said open position when each of said latch is in an unlatched configuration and said lock is in an unlocked configuration.

40. The pressure relief door assembly of any of examples 23-39, wherein operation of said latch is pressure dependent and operation of said lock is only temperature dependent.

41. A nacelle comprising the pressure relief door assembly of any of examples 23-40.

42. An aircraft comprising the nacelle of example 41.

43. An aircraft comprising the pressure relief door assembly of any of examples 23-40.

44. A pressure relief door assembly comprising a lock, said lock comprising:
    a housing;
    a bimetallic coil disposed within said housing;
    a locking member interconnected and movable with said bimetallic coil, movable relative to said housing, and at least partially disposed within said housing;
    an unlocked configuration where said bimetallic coil is in a contracted state and with said locking member being in a first position relative to said housing; and
    a locked configuration where said bimetallic coil is in an expanded state and with said locking member being in a second position relative to said housing where said locking member protrudes beyond said housing.

45. The pressure relief door assembly of example 44, wherein said locking member is a locking pin.

46. The pressure relief door assembly of any of examples 44-45, wherein said locking member is disposed within a bore within said housing.

47. The pressure relief door assembly of example 46, wherein a perimeter of said bore and a perimeter of said locking member are correspondingly shaped.

48. The pressure relief door assembly of any of examples 44-47, wherein said locking member comprises a locking end, wherein said locking end is spaced a first distance from a reference location when said locking member is in said first position and is spaced a second distance from said reference location when said locking member is in said second position, and wherein said second distance is greater than said first distance.

49. The pressure relief door assembly of any of examples 44-48, wherein said locking member fails to protrude beyond said housing when in said first position.

50. The pressure relief door assembly of any of examples 44-48, wherein said locking member protrudes further from said housing when in said second position compared to said first position.

51. A method of operating a pressure relief door assembly comprising a pressure relief door disposable in each of a closed position and an open position, a latch disposable in each of a latched configuration and an unlatched configuration relative to said pressure relief door, and a lock, said method comprising:
    changing said lock from an unlocked configuration to a locked configuration in response to a temperature satisfying a temperature threshold; and
    retaining said pressure relief door in said closed position with said lock being in said locked configuration.

52. The method of example 51, wherein satisfaction of said temperature threshold comprises said pressure relief door assembly being exposed to a temperature that at least one of reaches or exceeds a predetermined temperature.

53. The method of any of examples 51-52, wherein said changing said lock comprises moving a locking member of said lock into engagement with said latch to retain said latch in said latched configuration relative to said pressure relief door.

54. The method of any of examples 51-52, wherein said lock comprises a bimetallic coil and a locking member, and wherein said changing said lock comprises expanding said bimetallic coil.

55. The method of example 54, wherein said changing said lock further comprises moving said locking member into engagement with said latch to retain said latch in said latched configuration relative to said pressure relief door, and wherein said moving a locking member is in response to said expanding.

56. The method of any of examples 54-55, wherein said expanding comprises moving said locking member along an axial path in response to said expanding.

57. The method of any of examples 51-56, further comprising:

increasing a temperature to which said pressure relief door assembly is exposed while said latch in said latched configuration to retain said pressure relief door in said closed position; and executing said changing said lock in response to said increasing a temperature and before said latch changes from said latched configuration to said unlatched configuration in response to said increasing a temperature.

58. The method of example 57, further comprising:

decreasing a pressure threshold required for said latch to change from said latched configuration to said unlatched configuration in response to said increasing a temperature.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIG. 4A is a schematic of a pressure relief door assembly with a temperature-actuated lock, in accordance with various embodiments;

FIG. 6 is a schematic of a pressure relief door assembly with a temperature-actuated lock, in accordance with various embodiments.

DETAILED DESCRIPTION

Figure 1:
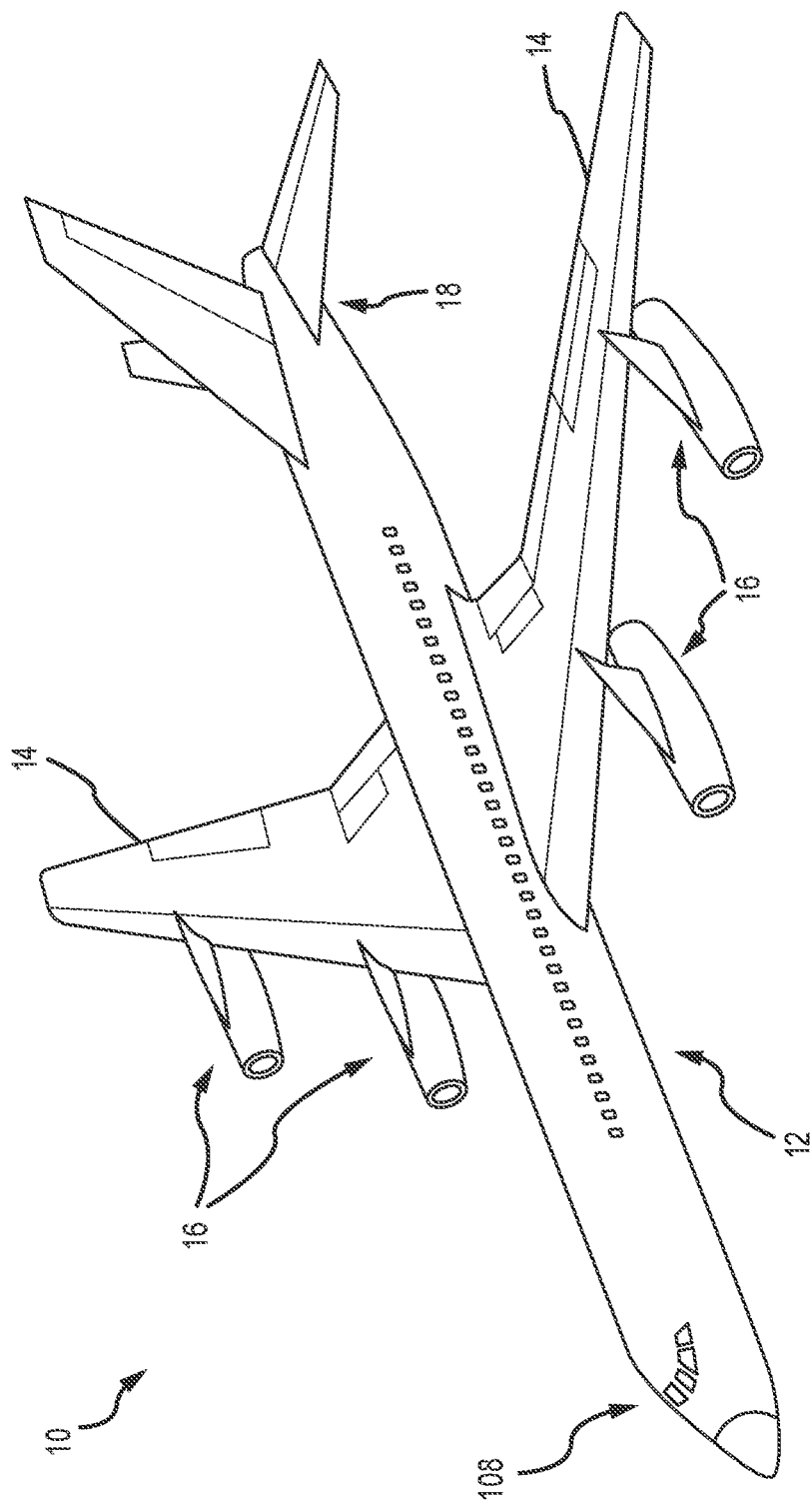
FIG. 1 is a perspective view of an aircraft in accordance with various embodiments.

A representative aircraft is illustrated in FIG. 1 and is identified by reference numeral 10. The aircraft 100 includes a fuselage 12, a pair of wings 14, a pair of engines 16 for each wing 14, a vertical stabilizer 18 at an aft end section of the aircraft 10, and a cockpit 20 at forward end section of the aircraft 100. Each engine 106 may be mounted to the corresponding wing 14 in any appropriate manner, including using any appropriate pylon.

Figure 2A:
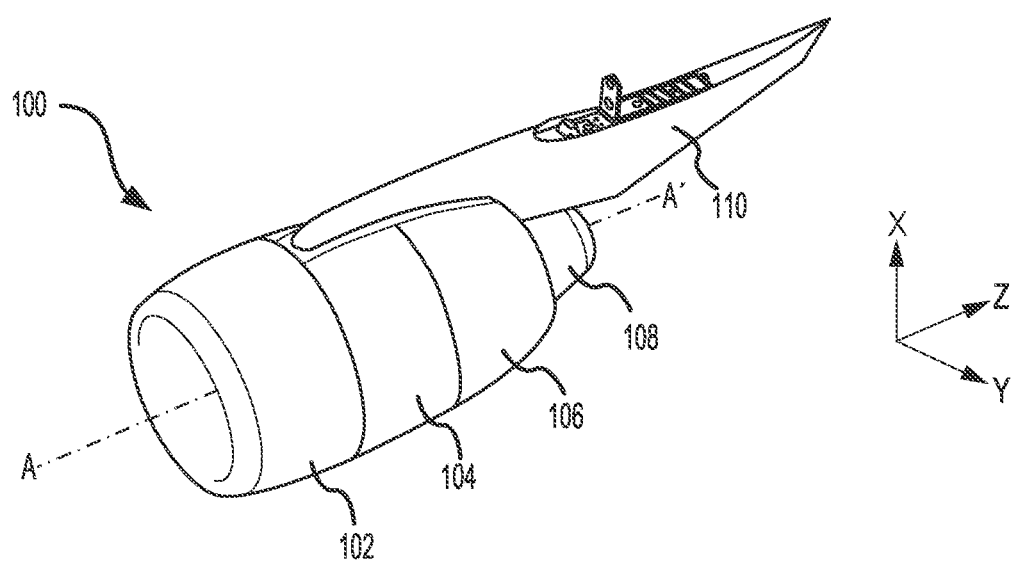
FIG. 2A is a perspective view of a nacelle, in accordance with various embodiments.

A nacelle 100 for a propulsion system is illustrated in FIG. 2A, in accordance with various embodiments. The nacelle 100 may include an inlet 102, a fan cowl 104, a thrust reverser 106, and an exhaust system 108. In various embodiments, the nacelle 100 may include a pylon 110. The pylon 110 may be configured to mount the nacelle 100 and an engine surrounded by nacelle 100 to an aircraft structure, such as a wing (e.g., a wing 14 of the aircraft 10 of FIG. 1) or aircraft fuselage.

Figure 2B:
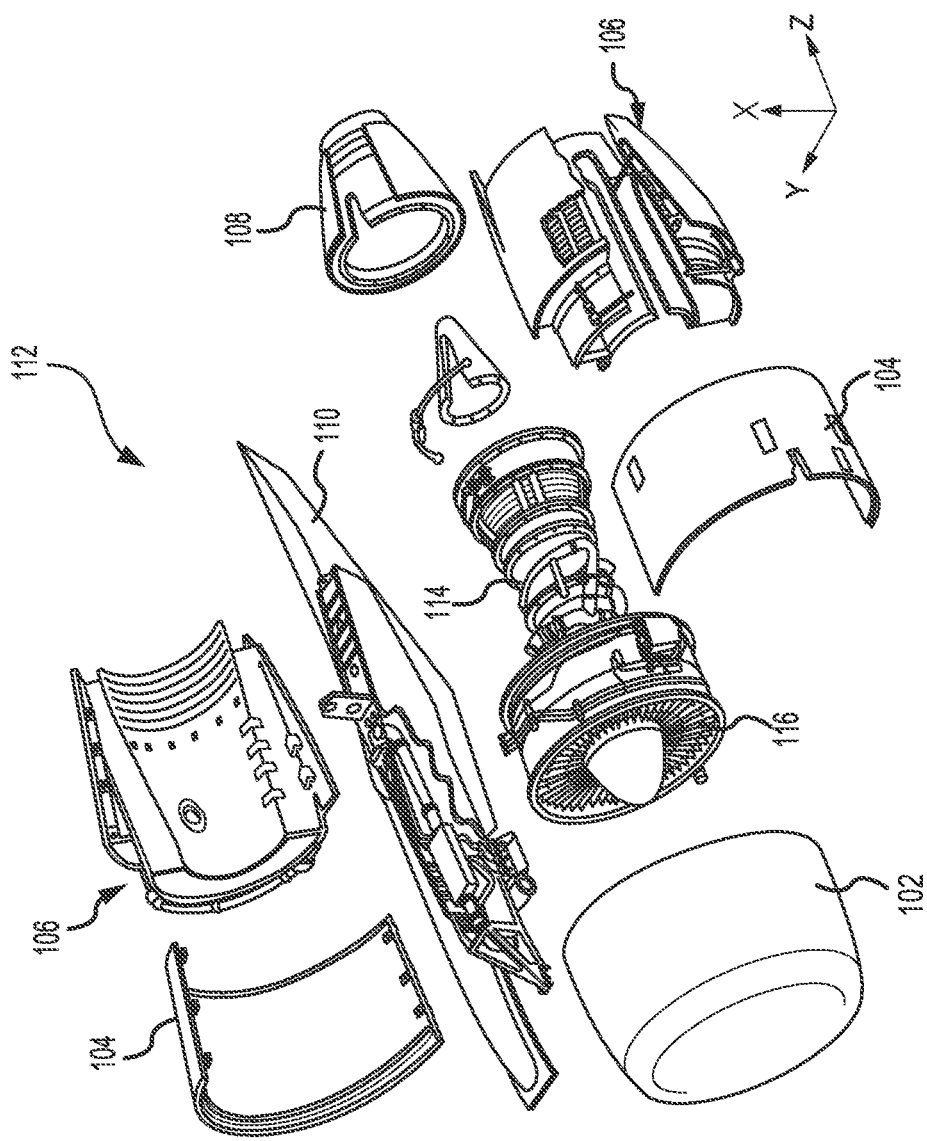
FIG. 2B is an exploded, perspective view of a propulsion system, in accordance with various embodiments.

With reference now to FIGS. 2A and 2B, an exploded view of a propulsion system 112 is illustrated, in accordance with various embodiments. In accordance with various embodiments, the propulsion system 112 includes the nacelle 100 and a gas turbine engine 114. The gas turbine engine 114 may be surrounded by components of the nacelle 100. The nacelle 100 may provide smooth, aerodynamic surfaces for airflow around and into the gas turbine engine 114.

In operation, a fan 116 of the gas turbine engine 114 draws and directs a flow of air into and through the propulsion system 112. Although the gas turbine engine 114 is depicted as a turbofan gas turbine engine herein, it should be understood that the concepts described herein are not limited to use with turbofans as the teachings may be applied to other types of turbine engines, including turbojet engines, low-bypass turbofans, high bypass turbofans, or any other gas turbine.

Figure 3:
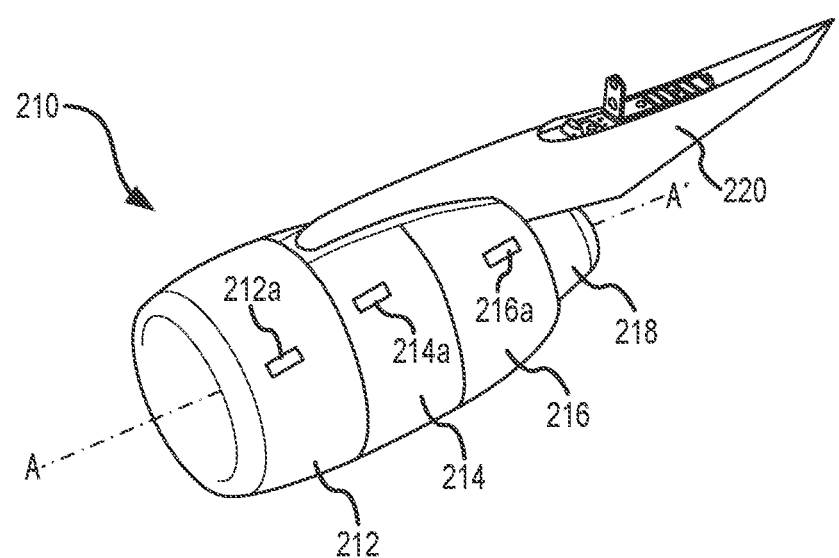
FIG. 3 is a perspective view of a nacelle with doors, in accordance with various embodiments.

Referring to FIG. 3, a nacelle 210 for a propulsion system is illustrated, in accordance with various embodiments. The nacelle 210 may include an inlet 212, a fan cowl 214, a thrust reverser 216, and an exhaust system 218. The inlet 212, fan cowl 214, thrust reverser 216, and exhaust system 218 may be positioned around a central longitudinal axis A-A' of the nacelle 210. The nacelle 210 provides smooth aerodynamic surfaces for airflow around and into a gas turbine engine surrounded by the nacelle 210. The nacelle 210 may be coupled to a pylon 220. The pylon 220 may be configured to mount the nacelle 210 and the gas turbine engine surrounded by nacelle 210 to an aircraft wing (e.g., a wing 14 of the aircraft 10 of FIG. 1) or aircraft body.

The nacelle 210 may include one or more doors, such as door 212a, door 214a, and door 216a. For example, the inlet 212 may include one or more doors 212a, the fan cowl 214 may include one or more doors 214a, and/or the thrust reverser 216 may include one or more doors 216a. In various embodiments, the doors 212a, 214a, 216a may translate between an open position, wherein an interior of nacelle 210 that is radially inward of the door is exposed, and a closed position, wherein the door contacts and/or forms a sealing interface with the underlying nacelle component (e.g., inlet 212, fan cowl 214 or thrust reverser 216). As used herein, "translate" and "translation" may refer to rotational motion, such as pivoting about a hinged joint, or to linear motion. In various embodiments, one or more of the doors 212a, 214a, 216a may be a pressure relief door configured to translate to the open position in response to a pressure differential across the door (i.e., the difference between the pressure in the area on the interior of the door and the pressure in the area on the exterior of the door) exceeding a preselected pressure differential. As used herein, "the area on the interior of a door" refers to a space or area that is radially inward of the door, and "the area on the exterior of a door" refers to a space or area that is radially outward of the door. One or more of the doors 212a, 214a, 216a could be used by the nacelle 100 of FIGS. 1-2.

Figure 4B:
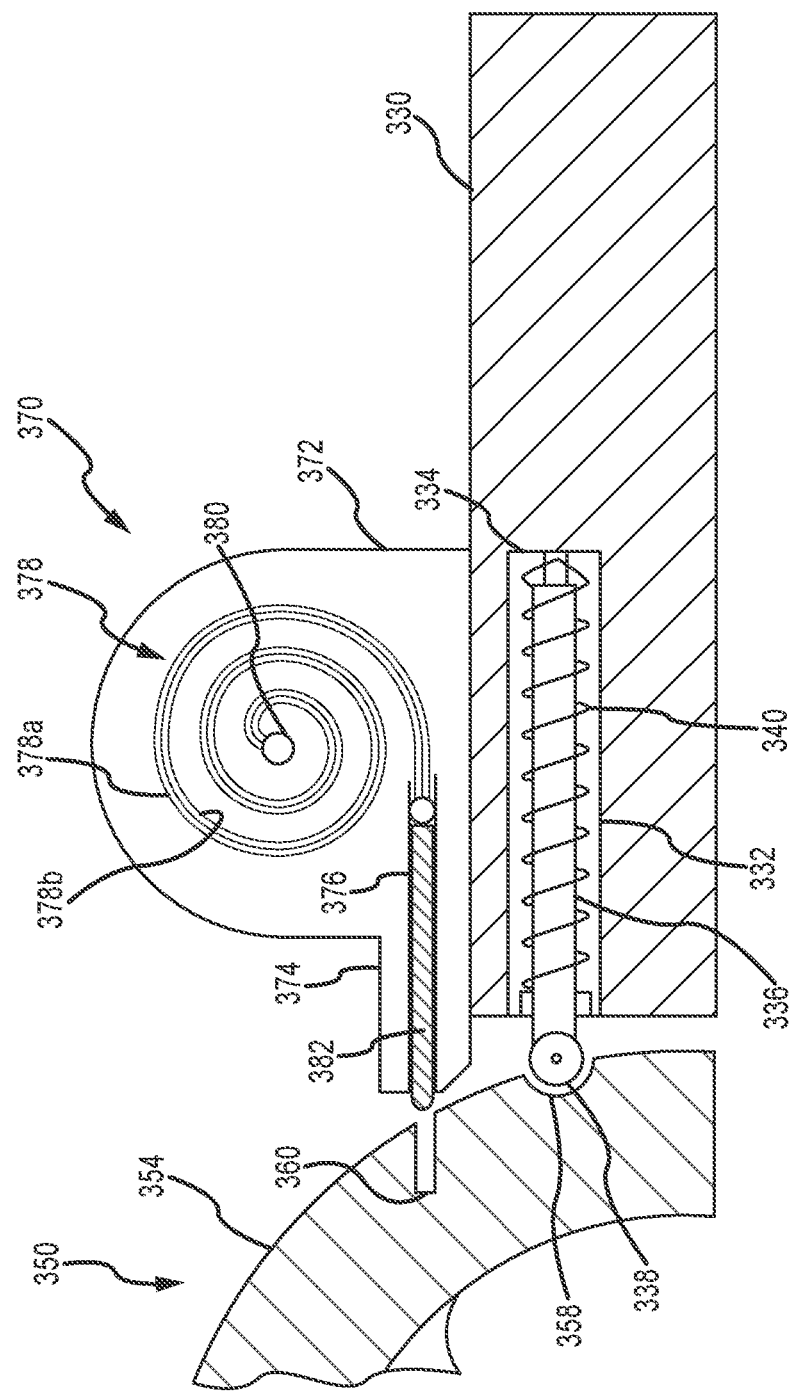
FIG. 4B is an enlarged view of a portion of the pressure relieve door assembly of FIG. 4A, in accordance with various embodiments.
Figure 4C:
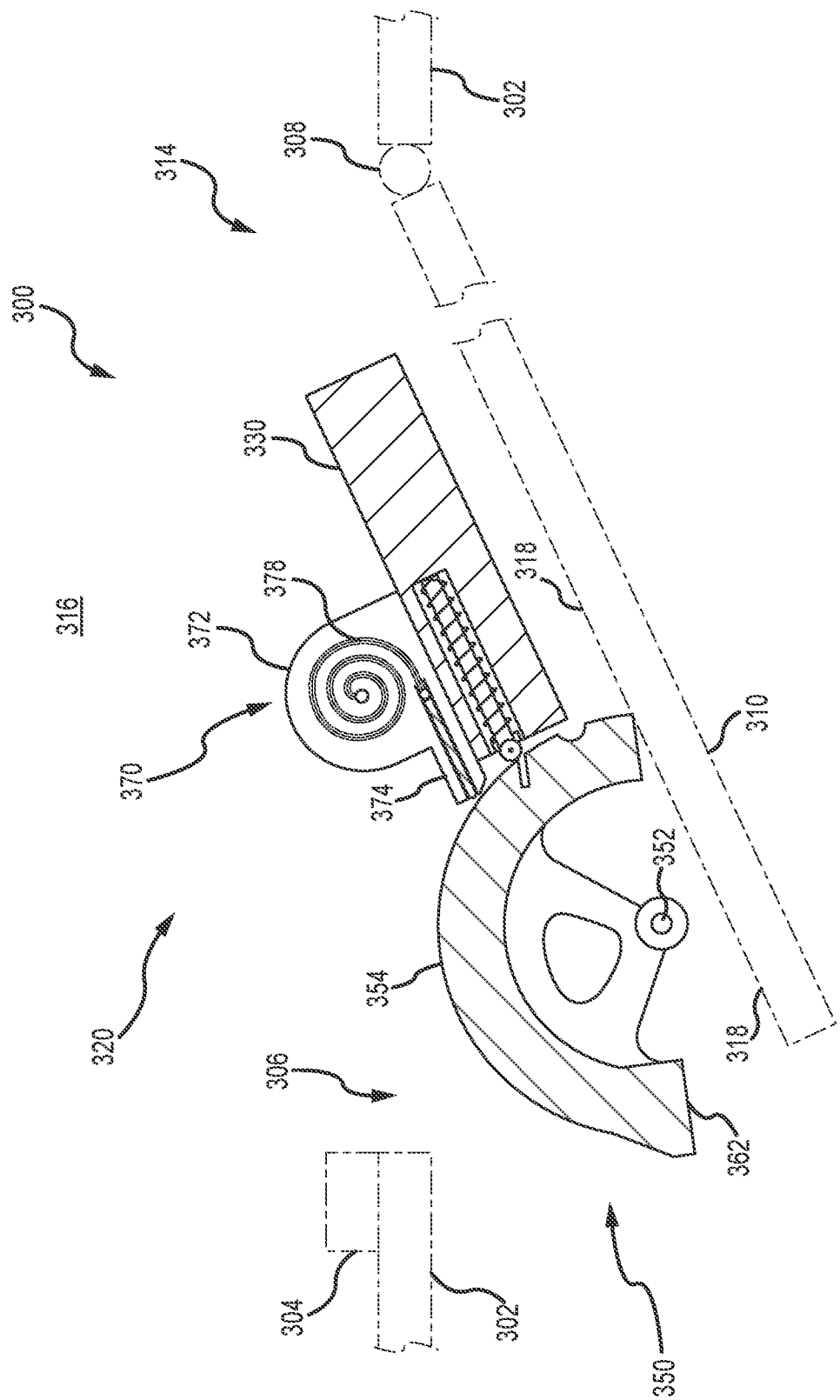
FIG. 4C is a schematic of the pressure relief door assembly of FIG. 4A in an open position, in accordance with various embodiments.

A pressure relief door assembly is illustrated in FIGS. 4A-4C and is identified by reference numeral 300. Components of the pressure relief door assembly 300 include a pressure relief door 310 and a latch 320 (the latch 320 in turn including a first latch component or latch body 330 and a second latch component or latch bolt 350). The pressure relief door 310 is disposable in each of a closed position 312 (FIG. 4A) and an open position 314 (FIG. 4C). The latch 320 is pressure-actuated and is disposable in each of a latched configuration (so as to retain the pressure relief door 310 in its closed position 312 of FIG. 4A) and an unlatched configuration (so as to allow the pressure relief door 310 to move to its open position 314 of FIG. 4C). FIG. 4A also shows the latch 320 in its latched configuration, while FIG. 4C also shows the latch 320 in its unlatched configuration. The lock 370 is temperature-actuated and is disposable in each of a locked configuration (so as to retain the pressure relief door 310 in its closed position 312 of FIG. 4A, and to also retain the latch 320 in its latched configuration of FIG. 4A) and an unlocked configuration (so as to allow the pressure relief door 310 to move to its open position 314 of FIG. 4C when the latch 320 is in its unlatched configuration).

The pressure relief door 310 includes an interior surface 318 that interfaces with an interior space 316 (e.g., an interior of a nacelle). Both the latch 320 and the lock 370 are disposed within this interior space 316. A hinge 308 of any appropriate type movably interconnects (e.g., pivotally) a door frame 302 and the pressure relief door 310. One or more hinges 308 may movably interconnect the doorframe 302 and the pressure relief door 310, and each such hinge 308 may be of any appropriate configuration. The pressure relief door 310 pivots about the hinge 308 in the direction of the arrow B to change the pressure relief door 310 from its closed position 312 of FIG. 4A to its open position 314 of FIG. 4C.

A stop or striker plate 304 may protrude from the door frame 302 for interfacing with the latch 320. A perimeter of the door frame 302 defines an opening 306 in which the pressure relief door 310 is disposed when in its closed position 312 of FIG. 4A. A space is shown between the outer perimeter of the pressure relief door 310 and the inner perimeter of the door frame 302 in FIG. 4A for clarity. An appropriate seal may be disposed between the door frame 302 and the pressure relief door 310.

The latch body 330 of the latch 320 may be formed from any appropriate material or combination of materials, and may be mounted to the pressure relief door 310 in any appropriate manner such that the latch body 330 is maintained in a fixed position relative to the pressure relief door 310. The latch body 330 includes a bore 332 in the form of a "blind hole," in that the bore 332 extends from a closed end 334 to a perimeter of the latch body 330. A detent 336 is movably disposed within the bore 332 of the latch body 330. A free end of the detent 336 that is disposable beyond the perimeter of the latch body 330 may include an enlarged head 338. One or more biasing members 340 (e.g., a spring 340) is disposed within the bore 332. One part of the spring 340 may be maintained in a fixed position relative to the latch body 330 (e.g., by the spring 340 being seated on the closed end 334), while another part of the spring 340 may be maintained in a fixed position relative to the detent 336. In any case, the spring 340 biases the detent 336 in the direction of the latch bolt 350.

The latch bolt 350 is movable relative to each of the pressure relief door 310 and the latch body 350, and may be movably interconnected with one or more of the pressure relief door 310 and the latch body 330 in any appropriate manner. This movable interconnection is shown as a rotational movement in FIG. 4A in that the latch bolt 350 is rotatable about a rotational axis 352 in the direction of the arrow A to change the latch 320 from its latched configuration of FIG. 4A to its unlatched configuration of FIG. 4C. In any case, the latch bolt 350 may be characterized as having an outer or perimeter wall 354 and a pair of oppositely disposed sidewalls 356 (one such sidewall 356 being shown in FIG. 6, discussed below). A detent recess or pocket 358 and a locking recess or pocket 360 are disposed on the perimeter wall 354 of the latch bolt 350. The latch bolt 350 further includes a stop 362 that cooperates with the striker plate 304 on the door frame 302 to change the latch 320 from its latched configuration (FIG. 4A) to its unlatched configuration (FIG. 4C) such that the pressure relief door 310 may be moved from its closed position 312 (FIG. 4A) to its open position 314 (FIG. 4C).

The lock 370 is maintained in a fixed position relative to each of the latch body 330 and the pressure relief door 310. FIGS. 4A and 4B illustrate the lock 370 being mounted in any appropriate manner to the latch body 330. The lock 370 includes a housing 372, which may include an extension 374. A bimetallic coil 378 is disposed within the interior of the housing 372, and includes a first metal layer 378a and a second metal layer 378b that are appropriately secured to one another. One portion of the bimetallic coil 378 is appropriately secured to an anchor location 380, with the bimetallic coil 378 being "coiled" about this anchor location 380. A locking pin 382 is appropriately attached to the bimetallic coil 378, for instance such that the locking pin 382 extends from a free end of the bimetallic coil 378. The locking pin 382 is movably disposed in a bore 376 that extends from within the interior of the housing 372 to a perimeter of the housing 372. An outer perimeter of the bore 376 may be correspondingly-shaped with an outer perimeter of the locking pin 382. In any case, the locking pin 382 may move axially relative to the housing 372 in response to expansion or contraction of the bimetallic coil 378.

As previously noted, the latch 320 is pressure-actuated. The head 338 of the detent 336 is disposed in the detent recess 358 of the latch bolt 350 to retain the pressure relief door 310 in the closed position 312 of FIG. 4A (the latched configuration for the latch 320). The latch 320 will remain in this latched configuration until a pressure threshold within the interior space 316 is satisfied. Satisfaction of the pressure threshold means at least one of: a) that the pressure within the interior space 316 at least one of reaches or exceeds a predetermined pressure; or b) an existence of at least a certain pressure differential across the pressure relief door 310. This predetermined pressure is directly proportional to the biasing force exerted by the spring 340, which in turn corresponds with the force that the detent 336 exerts on the latch bolt 350.

Prior to the satisfaction of the pressure threshold for the latch 320, the pressure within the interior space 316 will exert a force on the pressure release door 310 in the direction indicated by the arrows C in FIG. 4A (and that will attempt to move the pressure relief door 310 in a counterclockwise direction about the door hinge 308 in the view shown in FIG. 4A and represented by the arrow B). The force being exerted on the interior surface 318 of the pressure relief door 310 is opposed by the door frame 302 via the engagement between the stop 362 of the latch bolt 350 and the striker plate 304 on the door frame 302. When the pressure threshold for the latch 320 is satisfied (e.g., from a burst event), the latch bolt 350 will rotate about the rotational axis 352 (clockwise in the view shown in FIG. 4A and represented by the arrow A) and relative to the latch body 350 such that the head 338 of the detent 336 is disposed out of the detent recess 358 of the latch bolt 350 (the unlatched configuration for the latch 320). With the latch 320 now being in this unlatched configuration, the pressure relief door 310 may move from the closed position 312 of FIG. 4A to the open position 314 of FIG. 4C.

As previously noted, the lock 370 is temperature-actuated. Disposing the lock 370 in its locked configuration may be characterized as locking the latch 320 in its latched configuration, may be characterized as locking the pressure relief door 310 in its closed position 312, or both. The locking pin 382 disposed out of the locking recess 360 of the latch bolt 350 when the lock 370 in its unlocked configuration of FIG. 4A. The lock 370 will remain in this unlocked configuration until a temperature threshold within the interior space 316 is satisfied. Satisfaction of the temperature threshold means that the temperature within the interior space 316 at least one of reaches or exceeds a predetermined temperature (e.g., due to a fire within the interior space 316). When the temperature threshold is satisfied, the bimetallic coil 378 changes from the contracted configuration shown in FIG. 4A to an expanded configuration. This expansion of the bimetallic coil 378 produces a corresponding axial movement of the locking pin 382 that disposes the locking pin 382 within the locking recess 360 of the latch bolt 350 (e.g., the locking pin 382 will protrude beyond the housing 372 of the lock 370 at this time). With the locking pin 382 being disposed within the locking recess 360 of the latch bolt 350 (the locked configuration for the lock 370), the latch bolt 350 is unable to rotate relative to the latch body 330 such that the latch 320 is locked in its latched configuration of FIG. 4A. With the latch 320 being locked in its latched configuration, the pressure relief door 310 is similarly locked in its closed position 312 of FIG. 4A.

The free end of the locking pin 382 will be spaced further from a reference location (e.g., from a plane that is perpendicular to the locking pin 382 and that extends through the anchor location 380) when the lock 370 is in its locked configuration (again where the locking pin 382 is disposed in the locking recess 360 of the latch bolt 350) compared to its unlocked configuration (where the locking pin 382 is disposed out of the locking recess 360 of the latch bolt 350—FIG. 4A). Although the locking pin 382 could be entirely disposed within the housing 372 when the lock 370 is in its unlocked configuration, the locking pin 382 could instead protrude beyond the housing 372 when the lock 370 is also in its unlocked configuration (but by a lesser amount compared to when the lock 370 is in its locked configuration).

A fire within the interior space 316 may cause a temperature increase within the interior space 316 that could satisfy the temperature threshold of the lock 370 (such that the lock 370 is changed from its unlocked configuration to its locked configuration in accordance with the foregoing). At least a certain temperature increase within the interior space 316 may reduce the magnitude of the pressure threshold associated with the latch 320 (such that a reduced pressure within the interior space 316 would change the latch 320 from its latched configuration to its unlatched configuration, to in turn allow the pressure relief door 310 to change from its closed position 312 (FIG. 4A) to its open position 314 (FIG. 4C). In the case of a fire, allowing the pressure relief door 310 to move to its open position 314 would provide additional oxygen to support combustion. As such, the temperature threshold for the lock 370 may be selected such that the lock 370 changes from its unlocked configuration to its locked configuration with the latch 320 remaining in its latched configuration (which in turn maintains the pressure relief door 310 in its closed position 312) and which may be beneficial in relation to extinguishing a fire within the interior space 316.

Figure 5A:
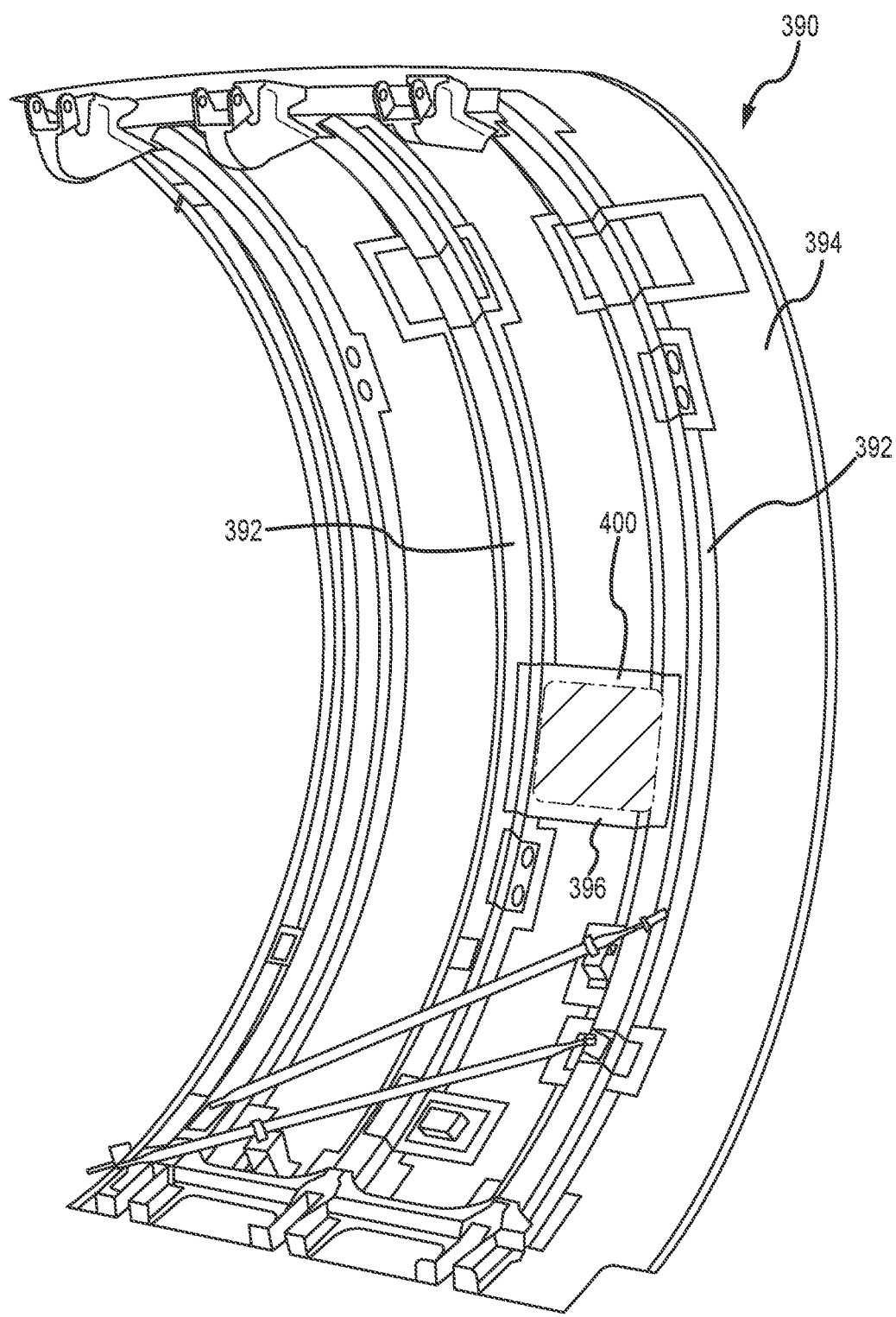
FIG. 5A is a perspective view of a housing that includes a pressure relief door assembly, in accordance with various embodiments.
Figure 5B:
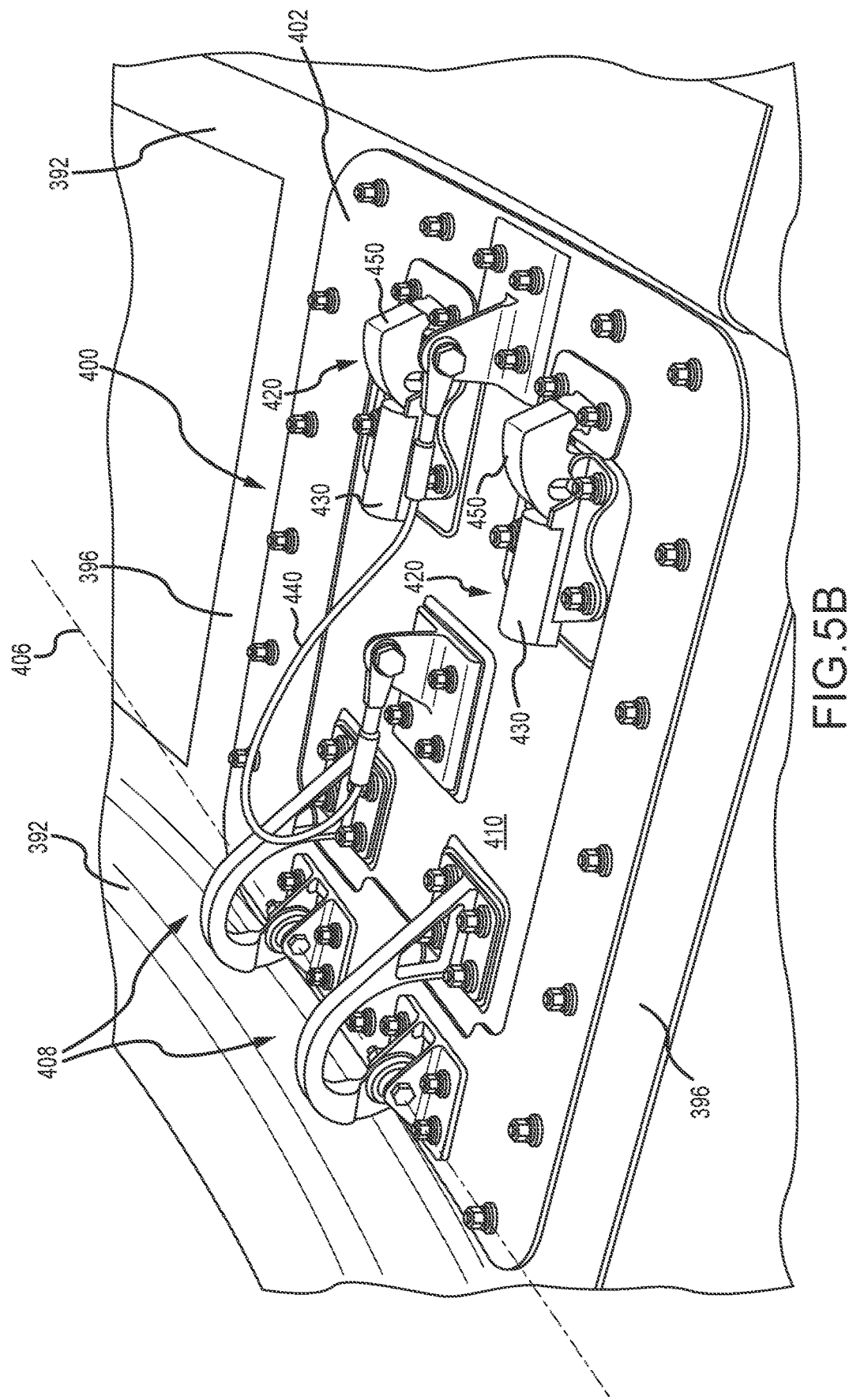
FIG. 5B is an enlarged, perspective view of the pressure relief door assembly from FIG. 5A, in accordance with various embodiments.
Figure 5C:
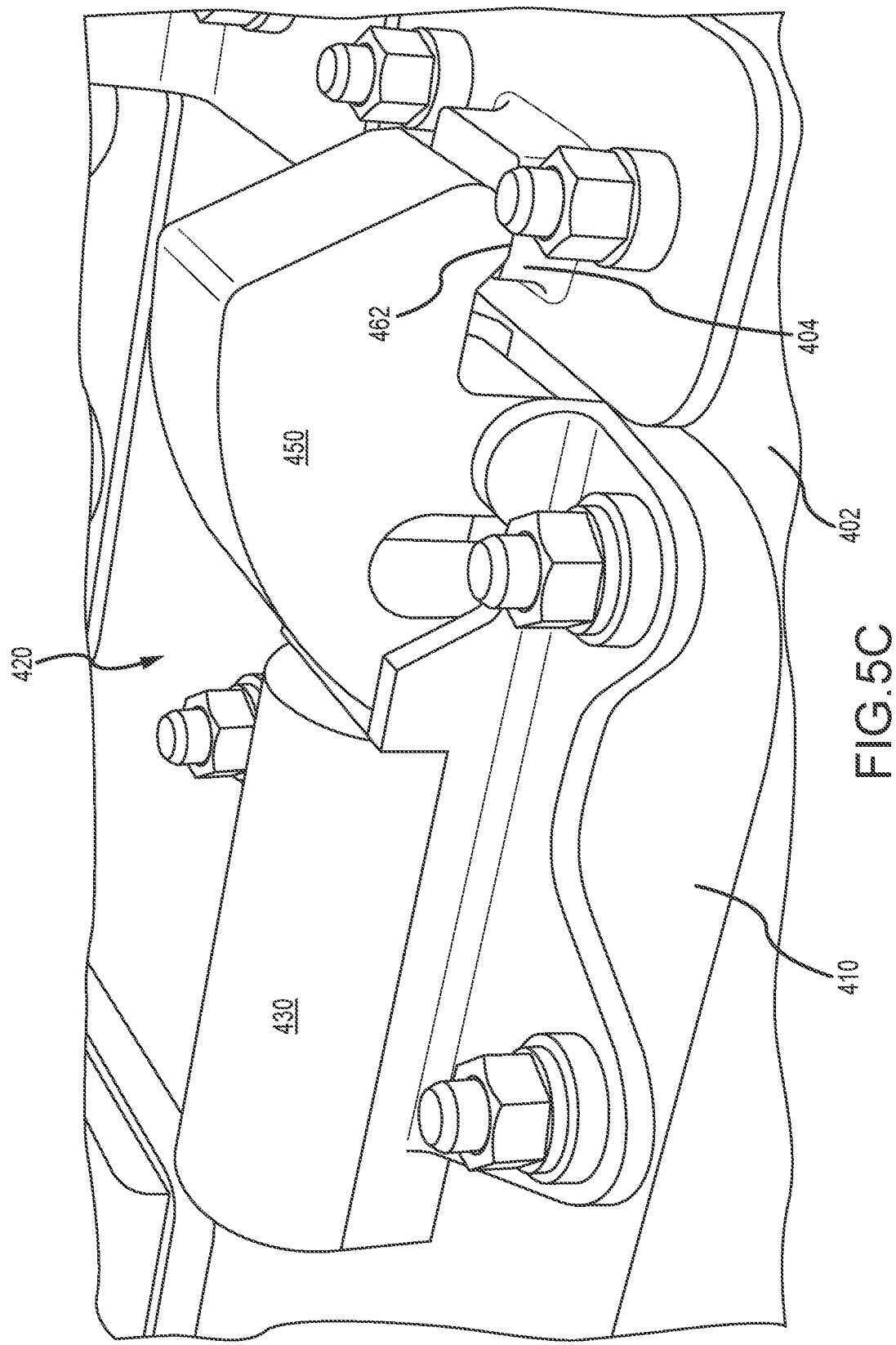
FIG. 5C is an enlarged, perspective view of one of the latches of the pressure relief door assembly from FIG. 5A, in accordance with various embodiments.

FIG. 5A-5C illustrate a housing section 390 that includes a pressure relief door assembly 400 (only schematically illustrated in FIG. 5A). The housing section 390 may be part of a nacelle for an aircraft. The housing section 390 may include a plurality of rails 392 that are spaced from one another along a longitudinal axis and that are disposed about this longitudinal axis. The rails 392 may be attached to an outer wall 394 of the housing section 390 in any appropriate manner. A support 396 may extend between an adjacent pair of rails 392 to accommodate mounting of the pressure relief door assembly 400 to the housing section 390.

The pressure relief door assembly 400 includes a door frame 402 (e.g., in accord with the door frame 302 of FIG. 4A), a stop or striker plate 404 (e.g., in accord with the striker plate 304 of FIG. 4A), a pressure relief door 410 (e.g., in accord with the pressure relief door 310 of FIG. 4A), and a latch 420 (e.g., in accord with the latch 320 of FIG. 4A). The door frame 402 may be mounted to the support 396 of the housing section 390 in any appropriate manner (e.g., via one or more fasteners such as bolts).

The latch 420 of the pressure relief door assembly 400 includes a first latch component or latch body 430 (e.g., in accord with the latch body 330 of FIG. 4A) and a second latch component or latch bolt 450 (e.g., in accord with the latch bolt 350 of FIG. 4A). The latch bolt 450 is rotatable relative to each of the pressure relief door 410 and the latch body 430 and includes a stop 462 (e.g., in accord with the stop 362 of FIG. 4A). The pressure relief door 410 is pivotally interconnected with the door frame 402 by a pair of door hinges 408 (e.g., in accord with the door hinge 308 of FIG. 4A), such that the pressure relief door 410 is rotatable about a hinge axis 406 for rotation relative to the housing section 390 between the closed position of FIG. 5A-5C (e.g., in accord with FIG. 4A) and an open position (e.g., in accord with FIG. 4C). A lanyard 440 may extend between the door frame 402 and the pressure relief door 410 to provide a limit for the open position of the pressure relief door 410.

The discussion of components in FIG. 4A that have a corresponding component in FIGS. 5A-5C remains applicable unless otherwise noted to the contrary. In addition, the lock 370 (FIG. 4A) may be disposed on/mounted to the latch body 430 of FIGS. 4B and 5C, in which case the foregoing discussion of the lock 370 will also equally apply to the pressure relief door assembly 400.

FIG. 6 presents a pressure relief door assembly 300' that is a variation of the pressure relief door assembly 300 of FIG. 4A (and thus is identified by a "single prime" designation in FIG. 6). Corresponding components between FIG. 4A and FIG. 6 are identified by the same reference numeral, and the discussion of these corresponding presented above with regard to FIG. 4A remains equally applicable to FIG. 6 unless otherwise noted herein to the contrary. The pressure relief door assembly 300' of FIG. 6 includes the same general pressure relief door 310, latch 320, and lock 370 of the pressure relief door assembly 300 of FIG. 4A. However, the lock 370 is disposed in a different position/orientation in FIG. 6 compared to FIG. 4A. Instead of the lock 370 being mounted on the latch body 330 (as in FIG. 4A), in the case of the pressure relief door assembly 300' of FIG. 6, the lock 370 is mounted either directly on the pressure relief door 310 or on a support (not shown) that in turn is mounted directly on the pressure relief door 310. Moreover, when the lock 370 is disposed in its locked configuration, its locking pin 382 extends into a locking recess 360' that intersects with a corresponding sidewall 356 of the latch bolt 350' for the case of the pressure relief door assembly 300' of FIG. 6.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A pressure relief door assembly, comprising:
   a pressure relief door movable between an open position and a closed position;
   a latch disposable in each of a latched configuration and an unlatched configuration relative to said pressure relief door; and
   a lock disposable in each of a locked configuration and an unlocked configuration relative to said latch, wherein said lock is configured to change from said unlocked configuration to said locked configuration in response to a temperature threshold being satisfied to retain said latch in said latched configuration to in turn retain said pressure relief door in said closed position;
   wherein satisfaction of said temperature threshold comprises said pressure relief door assembly being exposed to a temperature that increases to at least one of reach or exceed a predetermined temperature.

2. The pressure relief door assembly of claim 1, wherein said lock comprises a movable locking member, and wherein said locking member is engaged with said latch when said lock is in said locked configuration.

3. The pressure relief door assembly of claim 1, wherein said lock comprises a movable locking member and a bimetallic coil.

4. The pressure relief door assembly of claim 3, wherein said locking member is interconnected and movable with said bimetallic coil.

5. The pressure relief door assembly of claim 3, wherein said lock is disposed in said locked configuration when said bimetallic coil is in an expanded state and with said locking member being in an extended position with respect to a housing of said lock, and said lock is disposed in an unlocked configuration when said bimetallic coil is in a contracted state and with said locking member being in a retracted position with respect to said housing of said lock.

6. A pressure relief door assembly, comprising:
a latch body;
a detent movably interconnected with said latch body;
a lock comprising a bimetallic coil and a locking member interconnected and movable with said bimetallic coil; and
a latch bolt movable relative to the latch body, wherein said latch bolt comprises a detent recess alignable with said detent and a locking recess alignable with said locking member of said lock, wherein a latch comprises said latch body and said latch bolt, wherein said latch is in a latched configuration when said detent is disposed in said detent recess of said latch bolt, said lock is disposed in a locked configuration when said bimetallic coil is in an expanded state and with said locking member being disposed in said locking recess of said latch bolt, and said lock is disposed in an unlocked configuration when said bimetallic coil is in a contracted state and with said locking member being disposed out said locking recess of said latch bolt.

7. The pressure relief door assembly of claim 6, wherein said locking member is disposed out of said locking recess of said latch bolt prior to a temperature threshold being satisfied, and wherein said locking member is disposed within said locking recess of said latch bolt when said temperature threshold is satisfied.

8. The pressure relief door assembly of claim 6, wherein said locking member is disposed within said locking recess of said latch bolt in response to a temperature threshold being satisfied.

9. The pressure relief door assembly of claim 8, wherein satisfaction of said temperature threshold comprises said pressure relief door assembly being exposed to a temperature that at least one of reaches or exceeds a predetermined temperature.

10. The pressure relief door assembly of claim 6, further comprising a pressure relief door, wherein said latch body is retained in a fixed position relative to said pressure relief door and said latch bolt is movable relative to each of said latch body and said pressure relief door.

11. The pressure relief door assembly of claim 10, wherein said pressure relief door is movable between open and closed positions, wherein said pressure relief door is retained in said closed position when at least one of said latch is in said latched configuration and said lock is in said locked configuration.

12. The pressure relief door assembly of claim 11, wherein said pressure relief door is movable to said open position when each of said latch is in an unlatched configuration and said lock is in an unlocked configuration.

13. A nacelle comprising the pressure relief door assembly of claim 6.

14. A method of operating a pressure relief door assembly comprising a pressure relief door disposable in each of a closed position and an open position, a latch disposable in each of a latched configuration and an unlatched configuration relative to said pressure relief door, and a lock, said method comprising:
changing said lock from an unlocked configuration to a locked configuration in response to a temperature satisfying a temperature threshold;
retaining said pressure relief door in said closed position with said lock being in said locked configuration;
increasing a temperature to which said pressure relief door assembly is exposed while said latch in said latched configuration to retain said pressure relief door in said closed position; and
executing said changing said lock in response to said increasing a temperature and before said latch changes from said latched configuration to said unlatched configuration in response to said increasing a temperature.

15. The method of claim 14, wherein satisfaction of said temperature threshold comprises said pressure relief door assembly being exposed to a temperature that at least one of reaches or exceeds a predetermined temperature.

16. The method of claim 14, wherein said changing said lock comprises moving a locking member of said lock into engagement with said latch to retain said latch in said latched configuration relative to said pressure relief door.

17. The method of claim 14, wherein said lock comprises a bimetallic coil and a locking member, and wherein said changing said lock comprises expanding said bimetallic coil.

18. The method of claim 17, wherein said changing said lock further comprises moving said locking member into engagement with said latch to retain said latch in said latched configuration relative to said pressure relief door, and wherein said moving of the locking member is in response to said expanding.

* * * * *